(12) United States Patent
DeSanti

(10) Patent No.: US 8,264,985 B2
(45) Date of Patent: Sep. 11, 2012

(54) LOCALLY UNIQUE NODE PORT IDENTIFIERS

(75) Inventor: Claudio DeSanti, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 303 days.

(21) Appl. No.: 12/800,353

(22) Filed: May 12, 2010

(65) Prior Publication Data

US 2011/0280255 A1 Nov. 17, 2011

(51) Int. Cl.
H04L 12/28 (2006.01)
(52) U.S. Cl. .................................. 370/254; 370/395.2
(58) Field of Classification Search .................. 370/254, 370/255, 395.2, 395.3, 401
See application file for complete search history.

(56) References Cited

U.S. PATENT DOCUMENTS

| | | | |
|---|---|---|---|
| 7,512,123 B1 | 3/2009 | Desanti et al. | |
| 2006/0251067 A1* | 11/2006 | DeSanti et al. | 370/389 |
| 2009/0252181 A1* | 10/2009 | Desanti | 370/474 |
| 2009/0296726 A1* | 12/2009 | Snively et al. | 370/401 |
| 2011/0274114 A1* | 11/2011 | Dhar et al. | 370/401 |

OTHER PUBLICATIONS

RFC 3927, D. Cheshire et al., "Dynamic Configuration of IPv4 Link-Local Addresses", The Internet Society, May 2005.

* cited by examiner

*Primary Examiner* — Hong Cho
(74) *Attorney, Agent, or Firm* — Cindy Kaplan

(57) ABSTRACT

In one embodiment, a method includes selecting a locally unique node port identifier at a Fiber Channel over Ethernet (FCoE) node in communication with at least one other FCoE node through an Ethernet network, discovering a virtual node port at the other FCoE node, and establishing a virtual link between the FCoE nodes for use in local communication over the Ethernet network. An apparatus and logic are also disclosed.

20 Claims, 9 Drawing Sheets

LOCALLY UNIQUE NODE PORT IDENTIFIERS

BACKGROUND

The present disclosure relates generally to communication networks, and more particularly, to Node Port identifiers (N_Port_IDs) in a Fibre Channel over Ethernet (FCoE) network.

Demands for increasing link speeds and computing speeds have driven a variety of specialized computer networking architectures. There are networking architectures, such as Ethernet, which are widely utilized for communications based on Internet Protocol (IP). There are other networking architectures, such as Fibre Channel (FC), which are widely utilized in Storage Area Networks (SANs). FCoE is a technology for sending Fibre Channel traffic over Ethernet in order to enable a single networking technology to be utilized for both IP communications and SANs.

FCoE allows Fibre Channel to leverage Ethernet networks while preserving the FC protocol. The International Committee for Information Technology and Standards (INCITS) released the standard FC-BB-5 ("Fibre Channel, Backbone-5", Jun. 4, 2009), which covers FCoE. FC-BB-5 defines how to enable and instantiate virtual links between an end node and an FCoE Forwarder (FCF) and between FCFs.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
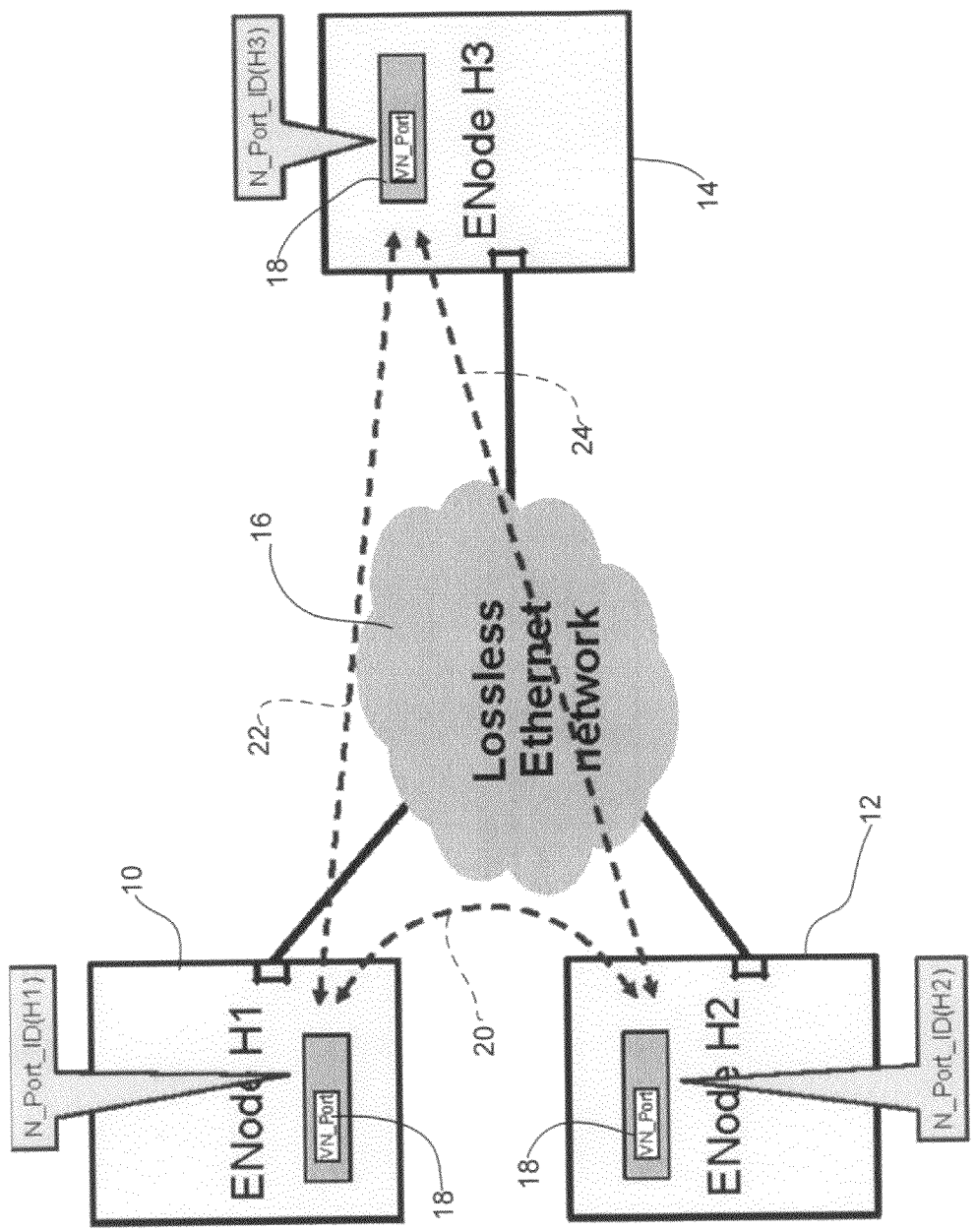
FIG. 1 illustrates an example of a network in which embodiments described herein may be implemented.

In one embodiment, a method generally comprises selecting a locally unique node port identifier at a Fibre Channel over Ethernet (FCoE) node in communication with at least one other FCoE node through an Ethernet network, discovering a virtual node port at the other FCoE node, and establishing a virtual link between the FCoE nodes for use in local communication over the Ethernet network.

In another embodiment, an apparatus generally comprises a processor for selecting a locally unique node port identifier, discovering a virtual node port at an FCoE node when the apparatus is in communication with the FCoE node through an Ethernet network, and establishing a virtual link between the apparatus and the FCoE node for use in local communication over the Ethernet network. The apparatus further includes memory for storing the locally unique node port identifier.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications. Thus, the embodiments are to be accorded the widest scope consistent with the principles and features described herein. For purpose of clarity, details relating to technical material that is known in the technical fields related to the embodiments have not been described in detail.

The embodiments described herein operate in the context of a Fibre Channel over Ethernet (FCoE) network and may be implemented at an FCoE node (ENode). The following provides a brief description of an FCoE network and associated terminology, before referring to the example embodiments.

In a Fibre Channel network, FC ports of FC nodes are designated as N_Ports (Node Ports). The N_Port is an end node port on the Fibre Channel fabric. The port may be a Host Bus Adapter (HBA) in a server or a target port on a storage array, for example. FC ports of FC switches are designated as F_Ports (Fabric Ports connected to N_Ports) or E_Ports (Expansion Ports connecting two switches). In the FCoE network, these constructs become virtual, because ports of ENodes and FCFs are Ethernet ports. Thus, the ports facing ENodes at the FCF are VF_Ports (virtual F_Ports), the ports at the ENodes are VN_Ports (virtual N_Ports), and ports between FCFs are VE_Ports (virtual E_Ports).

The ENode is an FC node that is able to transmit and receive FCoE frames using one or more ENode MACs. ENodes are the combination of FCoE termination functions and Fibre Channel stack on one or more Ethernet MACs, and in that sense are equivalent to host bus adapters (HBAs) in native FC networks. The FCF is the combination of FCoE termination functions and Fibre Channel switching function on one or more Ethernet MACs, and is therefore equivalent to an FC switch in native FC networks. An FCF may also contain an Ethernet switching function (dual-stack switch).

The embodiments described herein enable ENodes to allocate N_Port Identifiers (IDs) by themselves, without requiring FCF intervention. Thus, N_Port ID allocation for local communication is independent from FCF operations. In one embodiment, local communication is separated from fabric communication through a dedicated VN_Port. As described in detail below, local addresses are determined and VN_Port to VN_Port virtual links are instantiated and operate as point-to-point links in native Fibre Channel.

Figure 2:
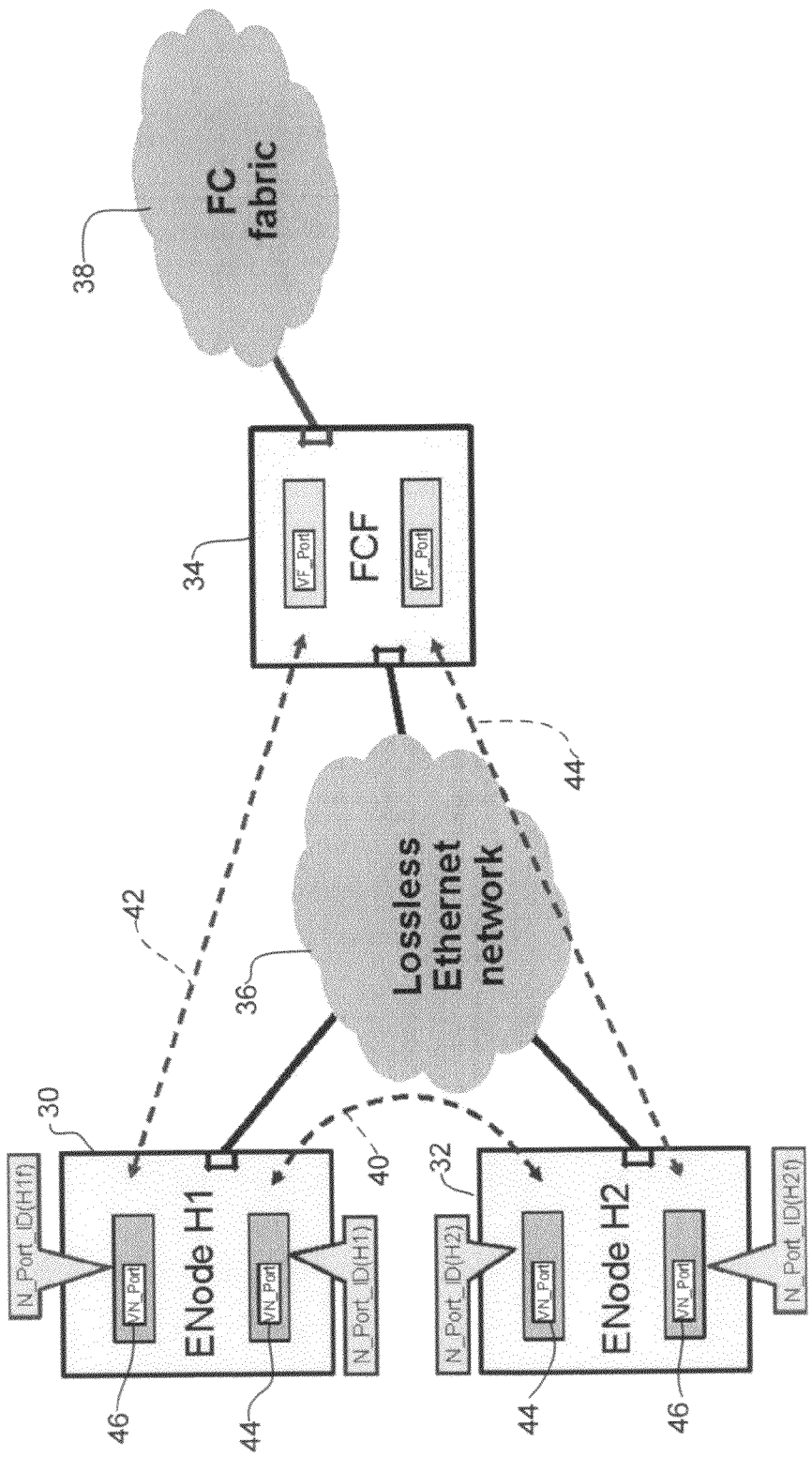
FIG. 2 illustrates another example of a network in which embodiments described herein may be implemented.

Referring now to the drawings, and first to FIGS. 1 and 2, networks in which embodiments described herein may be implemented are shown. The network in FIG. 1 includes a plurality of FCoE Nodes (ENodes) 10, 12, 14 in communication with one another through an Ethernet network 16. FIG. 2 illustrates two ENodes 30, 32 in communication with an FCoE forwarder (FCF) 34 through an Ethernet network 36. The FCF 34 may be in communication with one or more Storage Area Networks (SANs) via Fibre Channel (FC) fabric 38. The SAN may comprise a plurality of remote computer storage devices, such as disk arrays or tape libraries, and utilize a Fibre Channel fabric topology, for example. The FCF 34 includes FC forwarding logic and may include also Ethernet forwarding logic. The FCF 34 is configured to forward FCoE frames from the ENodes 30, 32 to the SANs and forward Fibre Channel frames from the SANs to one or more of the ENodes based on encapsulation of the received Fibre Channel frames in the FCoE frames. The FCF 34 includes suitable logic, interfaces, code, or circuits operable to encapsulate FC frames into FCoE frames, decapsulate FCoE frames into FC frames, and optionally perform Ethernet switching operations. The FCF 34 is also configured to forward FCoE frames from ENodes 30 to ENode 32 and vice versa.

Referring again to FIG. 1, ENodes 10, 12, 14 supporting VN_Port to VN_Port (VN2VN) virtual links include a VN_Port 18 dedicated to the instantiation of the virtual links (e.g., virtual link 20 between ENode 10 and ENode 12, virtual link 22 between ENode 10 and ENode 14, and virtual link 24 between ENode 12 and ENode 14). The VN_Port 18 is referred to herein as a 'VN2VN_Port'. FCoE frames originated by the VN2VN_Port 18 are transported over the lossless Ethernet network 16 to the VN2VN_Ports the originating VN2VN_Port is logged in with. VN2VN ENode MACs assign the N_Port_IDs to the VN2VN_Ports by themselves, without FCF intervention.

The N_Port_IDs used for VN_Port to VN_Port virtual links are unique within the Ethernet network 16 to which the VN2VN ENode MACs are connected and are suitable to be used only for communications over that Ethernet network. The N_Port_IDs are thus referred to herein as locally unique N_Port_IDs.

FIG. 2 illustrates an example in which two VN2VN ENodes 30, 32 instantiate a VN_Port to VN_Port virtual link 40 in the presence of FCF 34. Each VN2VN ENode MAC may instantiate a VN_Port to VF_Port virtual link 42, 44 with the FCF 34 using the protocols defined in FC-BB-5. However, the embodiments described herein allow the ENodes to instantiate VN_Port to VN_Port virtual links when the FCF 34 is not connected to the Ethernet network 36. Thus, the VN_Port to VN_Port virtual link 40 remains operational when the FCF 34 is disconnected from the Ethernet network 36. VN_Ports 44 used in the VN_Port to VN_Port virtual link 40 are therefore independent from VN_Ports 46 used in VN_Port to VF_Port virtual links 42, 44. This allows the VN_Port to VN_Port virtual link 40 to exist without the FCF 34.

Figure 3:
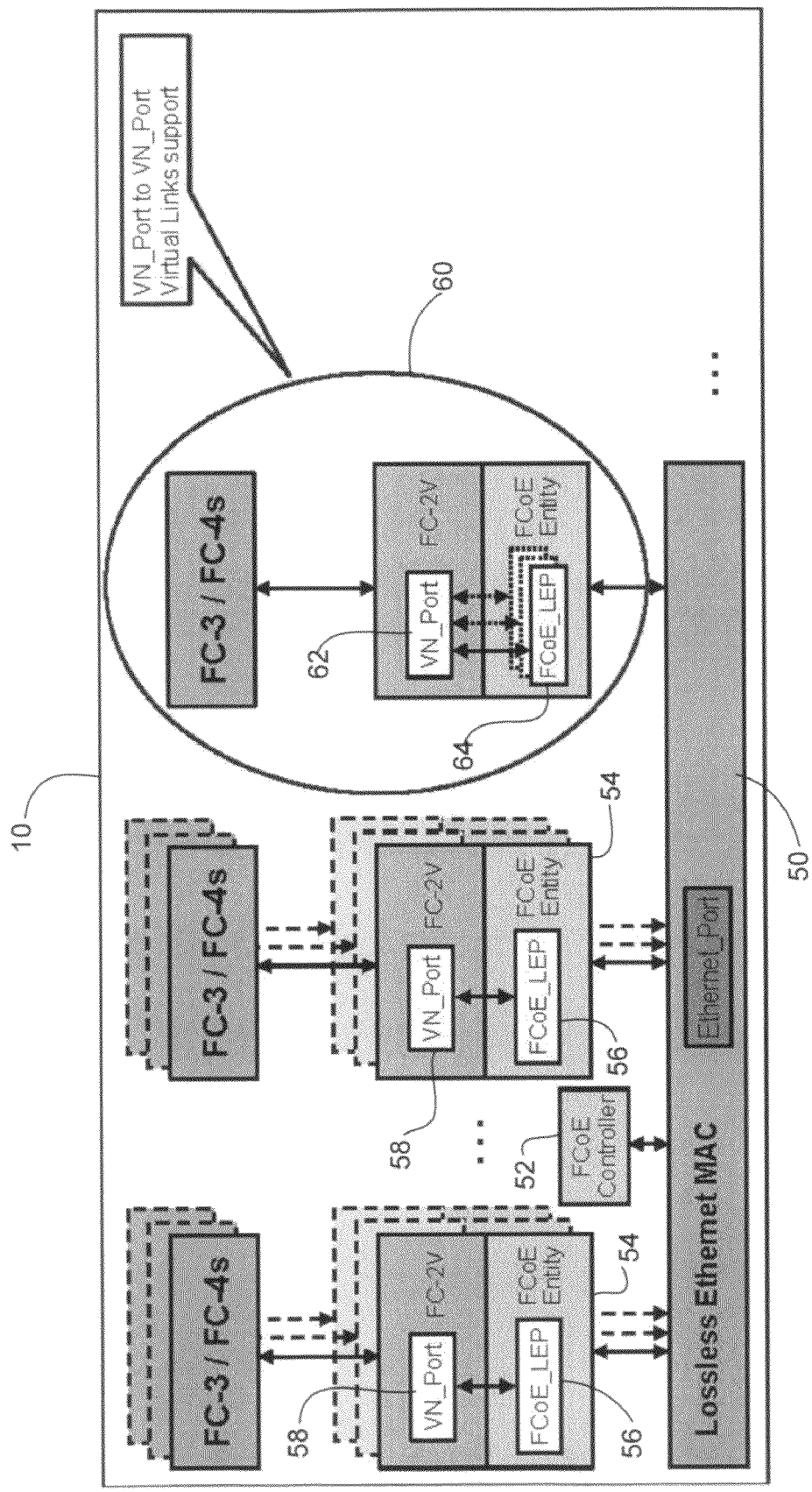
FIG. 3 is a model illustrating an ENode in the network of FIG. 1.

FIG. 3 illustrates a functional model of a VN2VN ENode (e.g., 10, 12, 14, 30, 32 of FIGS. 1 and 2). The ENode includes at least one lossless Ethernet MAC (ENode MAC) 50 and an FCoE controller 52. The FCoE controller 52 performs the FCoE Initialization Protocol (FIP) and instantiates or de-instantiates VN_Port/FCoE_LEP (Link End-Point) pairs as needed. The model illustrates the Fibre Channel layers (FC-3, FC-4, FC-2V) as described in the FC-BB-5 standard. FCoE entity 54 is an interface, containing one or more FCoE_LEPs 56, between VN_Port 58 and the lossless Ethernet MAC 50.

The FCoE_LEP 56 is the functional entity performing the encapsulation of FC frames into FCoE frames in transmission and the decapsulation of FCoE frames into FC frames in reception. The FCoE_LEP 56 operates according to the MAC address of the local link end-point and the MAC address of the remote link end-point. When encapsulating FC frames into FCoE frames, the MAC address of the local link end-point is used as a source address and the MAC address of the remote link end-point is used as a destination address of the generated FCoE frame. When decapsulating FC frames from FCoE frames, the FCoE_LEP 56 verifies that the destination address of the received FCoE frame is equal to the MAC address of the local link end-point and that the source address of the received FCoE frame is equal to the MAC address of the remote link end-point. If either of these checks fails, the FCoE frame is discarded.

The embodiments described herein provide a new element, designated at 60 in FIG. 3, which provides VN_Port to VN_Port virtual link support. The VN2VN ENode MAC has a VN_Port 62 dedicated to the instantiation of VN_Port to VN_Port virtual links. The VN_Port 62 is referred to herein as a VN2VN_Port. The FCoE controller 52 of the VN2VN ENode MAC may perform FIP FLOGIs (Fabric Logins) with multiple remote VN2VN ENode MACs to instantiate multiple VN_Port to VN_Port virtual links. This results in multiple FCoE_LEPs 64 associated with the VN2VN_Port 62.

For the FCoE_LEP 64 associated with the VN2VN_Port 62, the MAC address of the local link end-point is the FPMA (Fabric Provided MAC Address) associated with that VN2VN_Port and the remote link end-point address is the FPMA associated with the remote VN2VN_Port. In one embodiment, the source MAC address of FCoE frames used for VN_Port to VN_Port virtual links is the concatenation of the 24-bit VN2VN-FC-MAP constant with the source ID of the VN_Port, i.e., 'VN2VN-FC-MAP||S_ID', and the destination MAC address is the concatenation of the 24-bit VN2VN-FC-MAP constant with the destination ID of the VN_Port, i.e., 'VN2VN-FC-MAP||D_ID'. In an alternative embodiment, the MAC addresses used for a VN_Port to VN_Port virtual link may be the ENode MAC addresses of the involved ENode MACs.

The locally unique N_Port_ID (described below) determines the FPMA to be used as VN_Port MAC address. FPMA is a MAC address of the form FC-MAP (FCoE MAC address prefix)||N_Port_ID (FC-ID). In one embodiment, the FPMA used as the VN_Port MAC address for the VN2VN_Port 62 is determined by concatenating its locally unique N_Port_ID to the constant VN2VN-FC-MAP. This allows for easy identification of all MAC addresses used by FCoE for VN_Port to VN_Port communications, because they all share the same VN2VN-FC-MAP prefix. The value VN2VN-FCMAP is not used as a Fabric FC-MAP. Use of FPMAs enable effective and simple ACLs (Access Control Lists) to protect against undesired network joins and prevent data corruption when a network join is desired.

Figure 4:
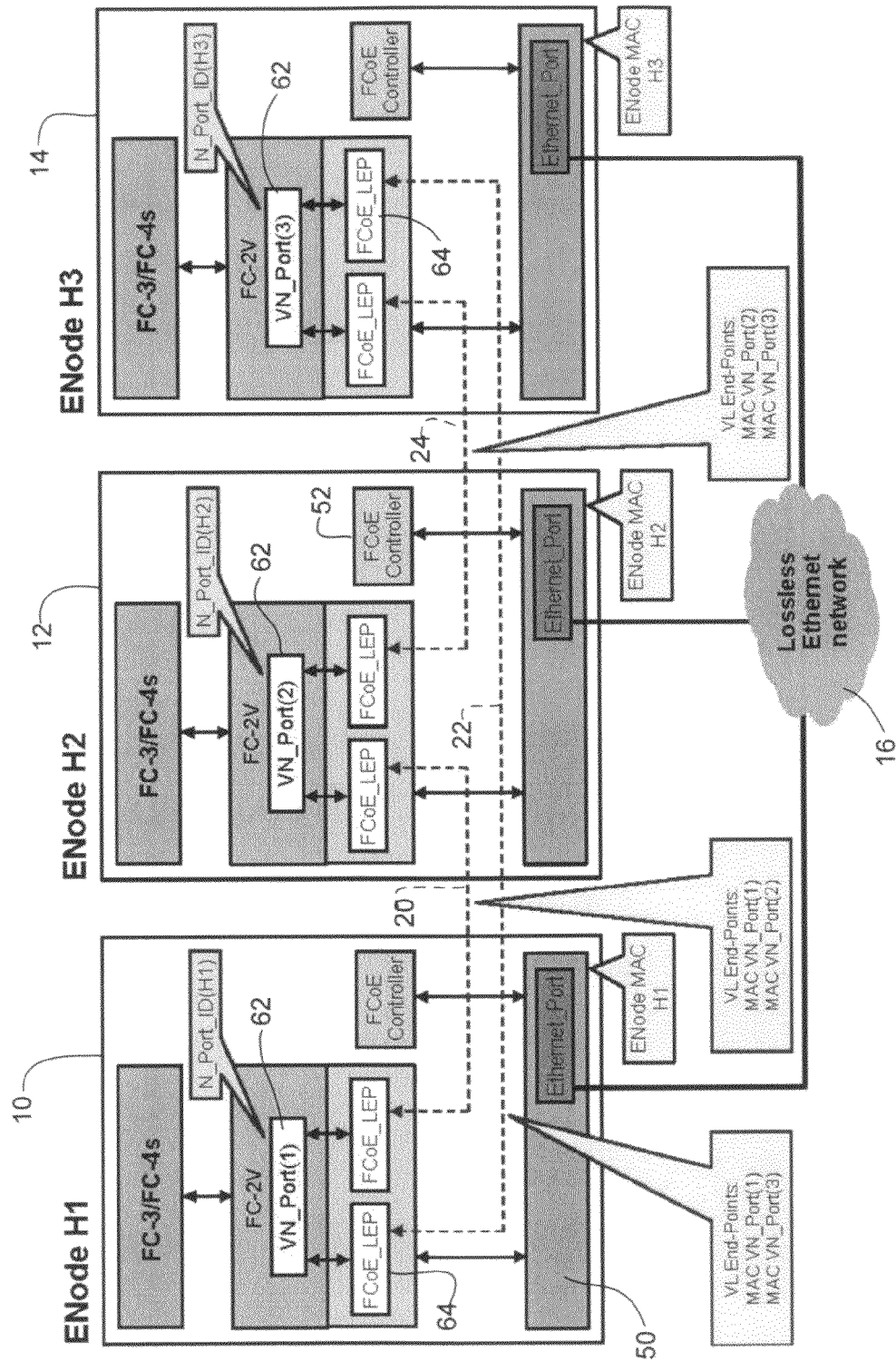
FIG. 4 illustrates VN_Port to VN_Port virtual links in the network of FIG. 1.

FIG. 4 illustrates how the functional model shown in FIG. 3 models VN_Port to VN_Port virtual links for the example illustrated in FIG. 1. As described above, each ENode includes an FCoE controller 52 and lossless Ethernet MAC 50 in communication with the Ethernet network 16. Each ENode (H1, H2, H3) also includes VN_Port 62 in communication with FCoE_LEPs 64. Each VN_Port 62 is assigned an N_Port_ID (VN_Port(1), VN_Port(2), VN_Port(3)), as described in detail below. VN_Port to VN_Port virtual links are instantiated upon successful completion of point-to-point FIP FLOGI exchanges (described below). The VN_Port to VN_Port virtual links 20, 22, 24 are identified by the two VN_Port MAC addresses (FPMAs) associated with the VN2VN_Ports 62. The virtual link end-points correspond to the VN_Ports' MAC addresses, as illustrated in FIG. 4.

Figure 5:
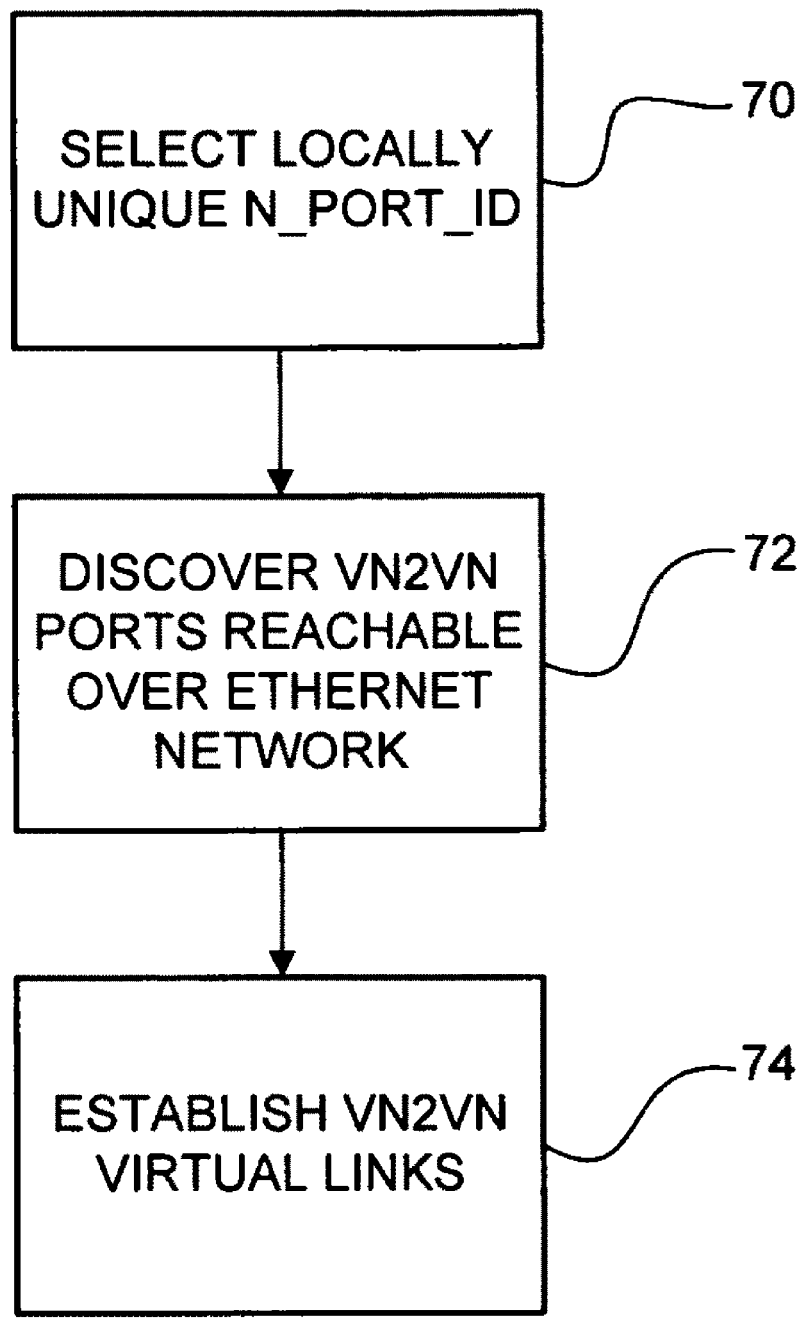
FIG. 5 is a flowchart illustrating an overview of a process for establishing the VN_Port to VN_Port virtual links of FIG. 4.

FIG. 5 is a flowchart illustrating an overview of a process for enabling local communication using locally unique N_Port identifiers, in accordance with one embodiment. At step 70, the VN2VN ENode selects a locally unique N_Port_ID. The VN2VN ENodes perform N_Port_ID assignment by themselves without FC fabric intervention. As described below, the N_Port_IDs are selected such that they are locally unique and configured such that they do not conflict with the N_Port_IDs assigned by the Fibre Channel fabric.

The ENode then discovers the VN2VN_Ports reachable over the Ethernet network to which they are connected (including their FC-4 support) (step 72). At step 74, the ENode establishes VN_Port to VN_Port virtual links with the discovered VN2VN_Ports. Details of the steps shown in FIG. 5 are described below.

Figure 6:
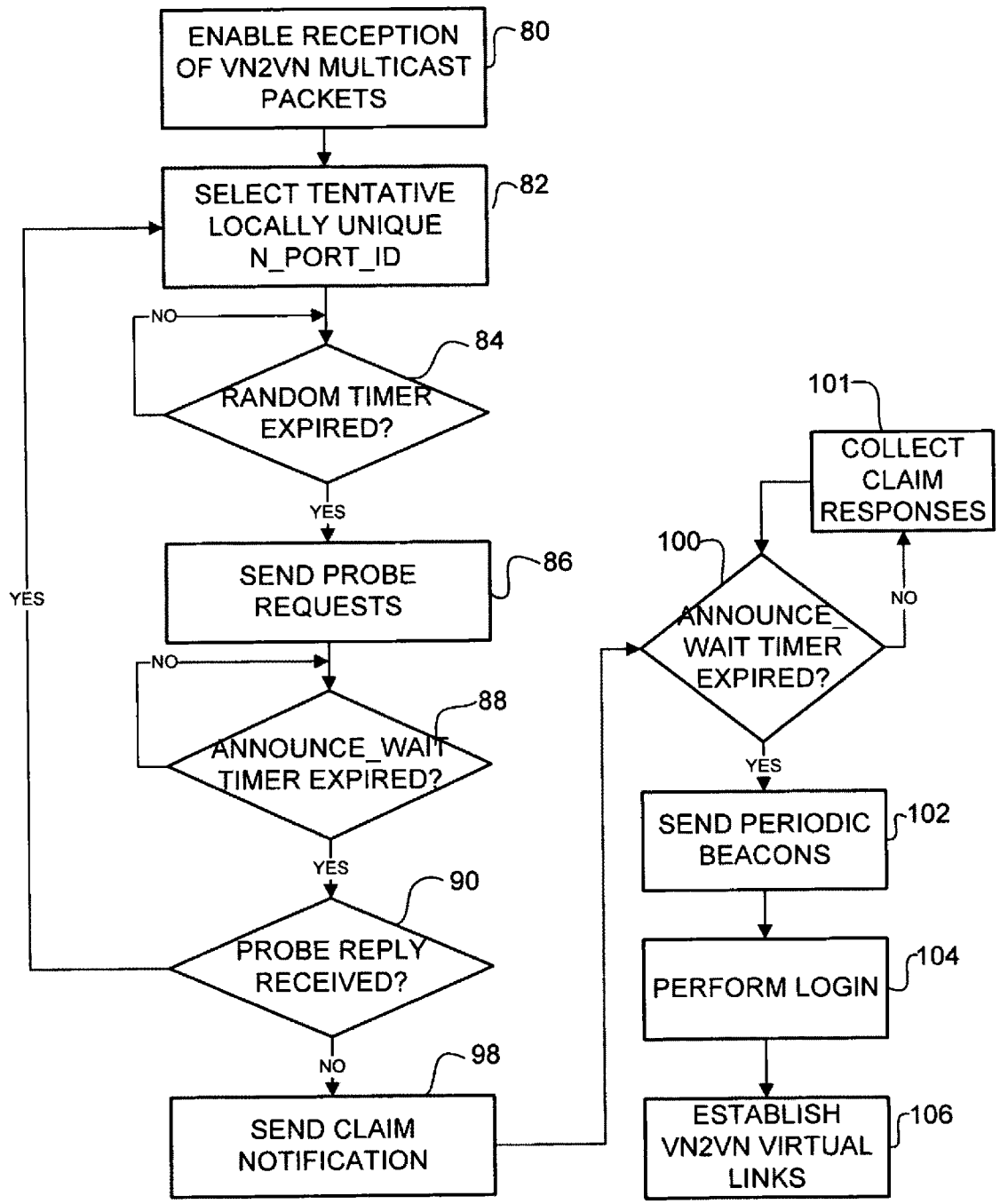
FIG. 6 is a flowchart illustrating a process for selecting locally unique N_Port identifiers, in accordance with one embodiment.

FIG. 6 is a flowchart illustrating a process for selecting the locally unique N_Port ID and establishing VN2VN virtual links, in accordance with one embodiment. The selection algorithm relies on VN2VN ENode MACs listening to a multicast MAC address All-VN2VN-ENode-MACs. When a VN2VN ENode MAC becomes operational, it enables reception of frames sent to All-VN2VN-ENode-MACs (step 80) and selects a tentative locally unique N_Port_ID (step 82). In one embodiment, the tentative locally unique N_Port_ID is a recorded locally unique N_Port_ID if available, that is remembered across reboots. For example, VN2VN ENode MACs that are equipped with persistent storage may record the locally unique N_Port_ID they have selected for themselves. Upon booting, VN2VN ENode MACs with a recorded locally unique N_Port_ID preferably use that locally unique N_Port_ID as their first candidate when probing (described below). This increases the stability of N_Port_IDs. For example, if a group of VN2VN ENode MACs are powered off, then when they are powered on they all resume using the previous locally unique N_Port_IDs, instead of picking different N_Port_IDs and potentially having to resolve conflicts. The recorded locally unique N_Port_ID may be also administratively configured.

If there is no recorded locally unique N_Port_ID, one is selected through a pseudo-random number generator with a uniform distribution in the range 000001h . . . 00FFFEh. In conventional networks operating in accordance with FC-SW-5, the Fibre Channel fabric does not assign N_Port_IDs with Domain_IDs in the range F0h . . . FEh and 00h. However, an N_Port_ID with a Domain_ID in this range is valid per FC-FS-3 and therefore suitable to be used for VN_Port to VN_Port configurations. Thus, in one embodiment, locally unique N_Port_IDs have the format '00.xx.yy'h (i.e., N_Port_IDs having the value 00h as Domain_ID). This assures that they do not conflict with N_Port_IDs assigned by the Fibre Channel fabric.

The pseudo-random number generator is preferably seeded with the N_Port_Name of the VN2VN_Port for which the locally unique N_Port_ID is being selected. This allows different ENode MACs to generate different numbers and a VN2VN_Port to usually be associated with the same N_Port_ID each time it is enabled. The pseudo-random number generation algorithm is preferably chosen so that different VN2VN ENode MACs do not generate the same sequence of numbers.

After selecting a tentative locally unique N_Port_ID, the VN2VN ENode MAC probes the lossless Ethernet network to which it is connected to check if the locally unique N_Port_ID is already in use. The VN2VN ENode MAC waits for a time interval (e.g., random time interval selected uniformly in the range zero to PROBE_WAIT (e.g., 100 milliseconds)) and then transmits multicast N_Port_ID probe requests to all VN2VN ENode MACs (steps 84 and 86). In one embodiment, two probe requests are transmitted. The probe requests may be spaced PROBE_WAIT milliseconds apart, for example. Referring to the example shown in FIG. 4, ENode H1 sends a probe request with a multicast address of ALL-VN2VN-MACs with a N_Port_ID of H1. The probe request is received at ENodes H2 and H3. Similarly, ENode H2 sends a probe request with a N_Port_ID of H2, and ENode H3 sends a probe request with a N_Port_ID of H3.

If during a wait period from the beginning of the probing process until ANNOUNCE_WAIT (e.g., 400 milliseconds) after the last N_Port_ID Probe Request is sent (step 88), the VN2VN ENode MAC receives any N_Port_ID Probe Reply (step 90), then the VN2VN ENode MAC treats the tentative N_Port_ID as being already in use, selects a new random tentative locally unique N_Port_ID (step 82), and repeats the process (e.g., waits for a random time interval and then transmits two N_Port_ID Probe Requests) (steps 84 and 86).

If by ANNOUNCE_WAIT milliseconds after the transmission of the last N_Port_ID Probe Request, no conflicting N_Port_ID Probe Reply or N_Port_ID Probe Request has been received (as described below), the VN2VN ENode MAC successfully claims the selected locally unique N_Port_ID. After claiming a locally unique N_Port_ID, the VN2VN ENode MAC announces its claimed address by transmitting a multicast N_Port_ID Claim Notification to All-VN2VN-ENode-MACs (step 98). An N_Port_ID Claim Notification notifies the other VN2VN ENode MACs on the lossless Ethernet network of the selected locally unique N_Port_ID. This causes all other VN2VN ENode MACs on the network to reply with a unicast N_Port_ID Claim Response. The N_Port_ID Claim Notification provides the maximum FCoE size the VN2VN ENode MAC intends to use for VN_Port to VN_Port virtual links. N_Port_ID Claim Response FIP PDUs preferably have a length that matches the minimum of the FCoE sizes supported by the two involved VN2VN ENode MACs. Upon transmitting the N_Port_ID Claim Notification, the VN2VN ENode MAC preferably waits for ANNOUNCE_WAIT milliseconds to collect the N_Port_ID Claim Responses (steps 100 and 101).

The VN2VN ENode MAC maintains the received N_Port_ID Claim Responses in a VN2VN Neighbor Set, from which it determines the VN2VN ENode MACs with which to establish VN_Port to VN_Port Virtual Links (the VN2VN Login Set), on the basis of their FC-4 support. For example, referring again to FIG. 1, ENode H1 has a neighbor set of H2, H3; ENode H2 has a neighbor set of H1, H3; and ENode H3 has a neighbor set of H1, H2. Upon receiving an N_Port_ID Claim Notification, the VN2VN ENode MAC adds the notifying VN2VN_Port to its VN2VN Neighbor Set. When the ANNOUNCE_WAIT timer has expired, after collecting the N_Port_ID Claim Responses, the VN2VN ENode MAC transmits a multicast N_Port_ID Beacon (also referred to as a VN2VN Advertisement) to All-VN2VN-ENode-MACs and continues to transmit multicast N_Port_ID Beacons periodically every ADV_VN_PERIOD (e.g., 8000 milliseconds) (step 102). Periodic multicast N_Port_ID Beacons enable detection of network joins so that potential N_Port_ID conflicts can be resolved.

The FCoE controller of a VN2VN ENode MAC instantiates VN_Port to VN_Port Virtual Links upon successful completion of a point-to-point FIP FLOGI (step 104). In one embodiment, both HP FLOGI Request and LS_ACC (Link Service Accept) have the locally unique N_Port_ID selected for the originating VN2VN_Port as S_ID for the point-to-point FLOGI protocol, and the associated originating VN_Port FPMA in the MAC address descriptor. The VN2VN_Port with the greater N_Port_Name proceeds to N_Port Login, with the PLOGI (Port Login) ELSs (Extended Link Services) encapsulated in FCoE. The FCoE PLOGI Request has the Locally Unique N_Port_ID of the originating VN2VN_Port as S_ID and the Locally Unique N_Port_ID of the destination VN2VN_Port as D_ID. Upon completion of FCoE PLOGI, the VN2VN virtual link is established (step 106) and the VN_Ports operate in point-to-point mode.

A VN_Port to VN_Port virtual link is explicitly de-instantiated by performing a FIP LOGO to de-instantiate the FCoE_LEPs. In both cases the S_ID and D_ID on the encapsulated LOGO ELS are set to the locally unique N_Port_IDs.

It is to be understood that the processes illustrated in the flowcharts of FIGS. 5 and 6 are only examples and that steps may be removed, added, or reordered, without departing from the scope of the embodiments. The example described above is for use in multipoint operations. The process may also be used for point-to-point operations (e.g., between two ENodes), in which case there is no need to send probe requests or wait for probe replies. Instead, a P2P (Point-to-Point) discovery or claiming process is used, without the steps for the probing state. For example, a discovery state may be used to determine if there is only one neighbor ENode MAC. As an alternative to a discovery state for point-to-point operations, the claiming state may be used and an error identified if more than one claim response is received.

Figure 7A:
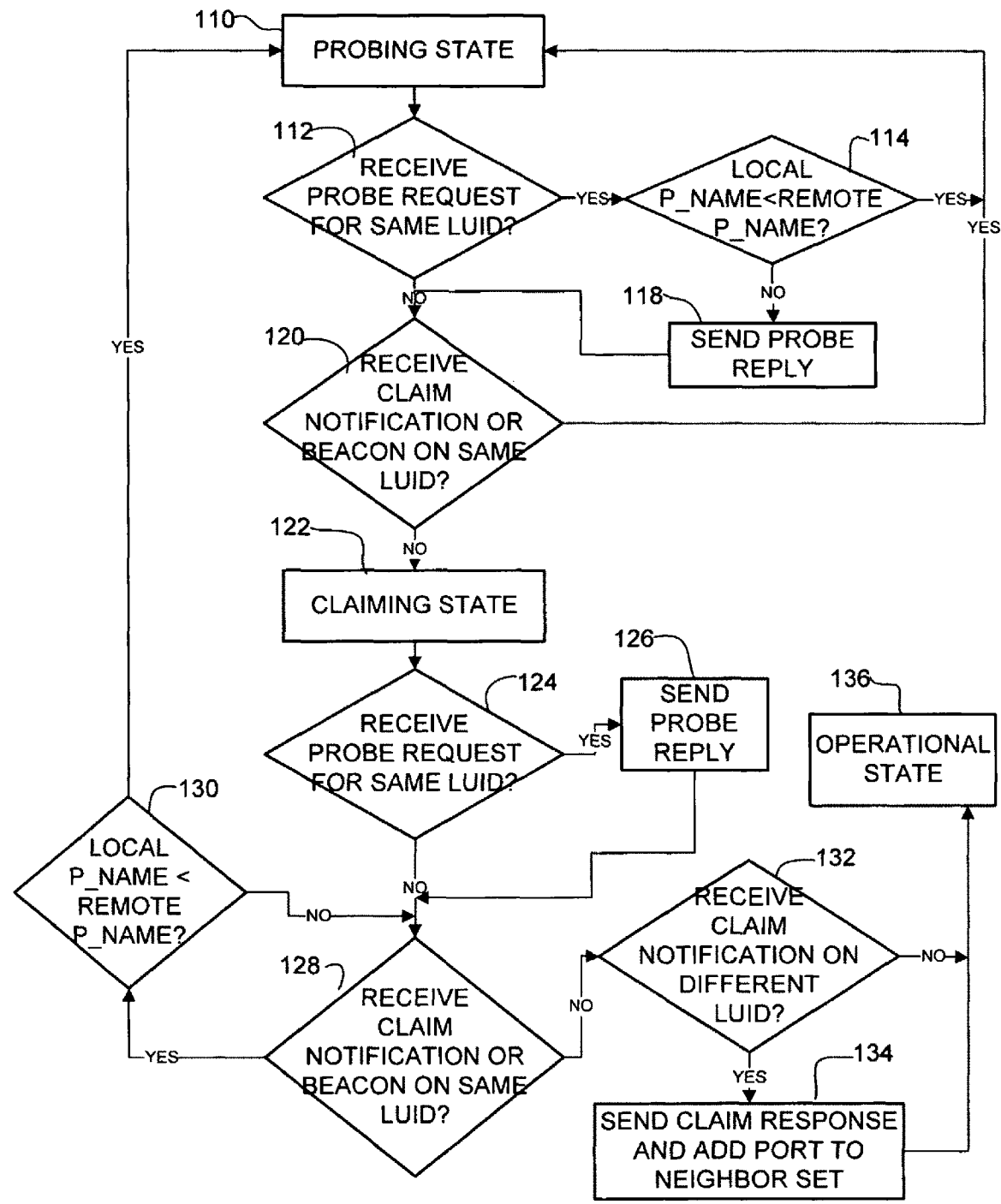
FIG. 7A is a flowchart illustrating how conflicts between the N_Port identifiers are handled in probing state and claiming state, in accordance with one embodiment.
Figure 7B:
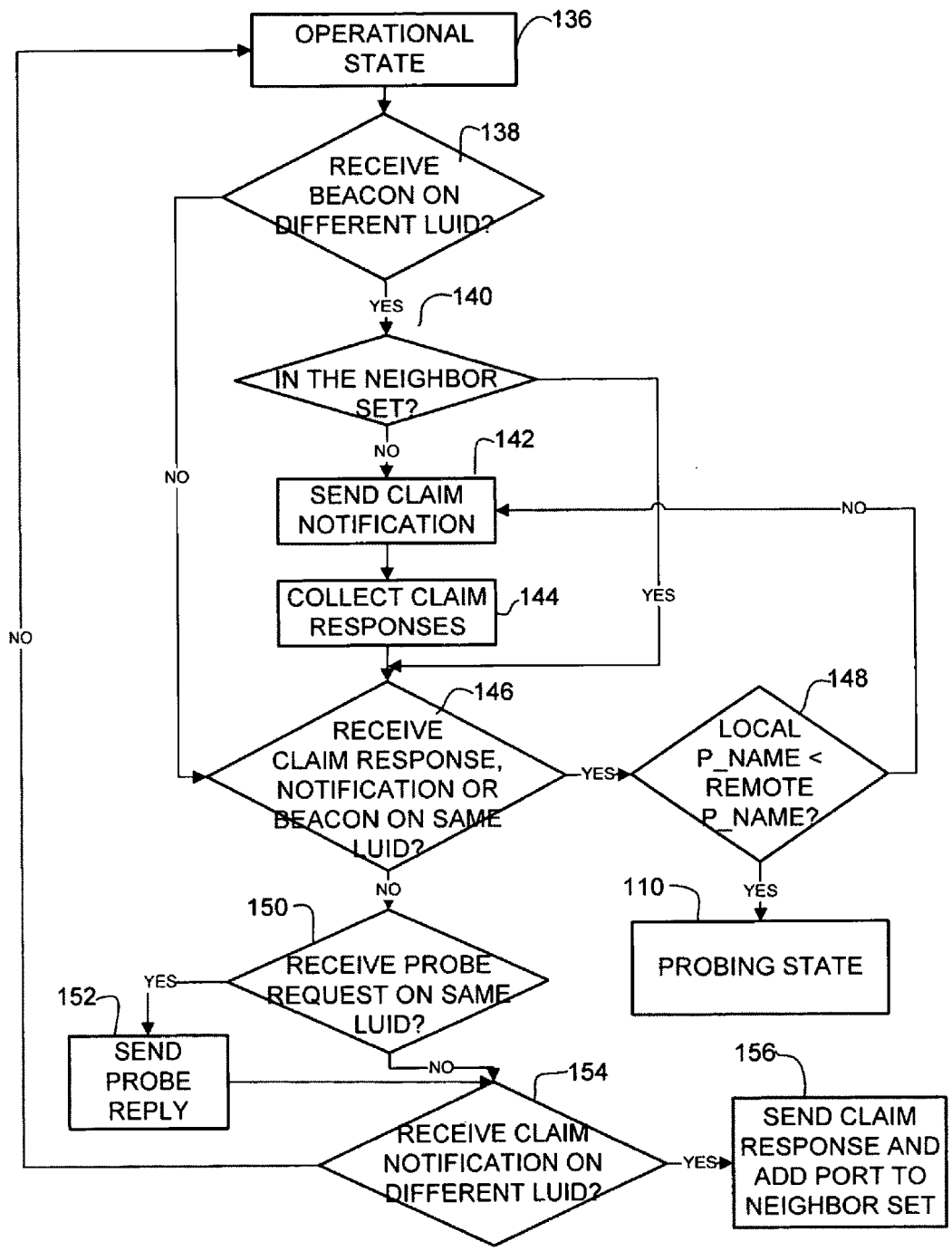
FIG. 7B is a flowchart illustrating how conflicts between the N_Port identifiers are handled in operational state, in accordance with one embodiment.

FIGS. 7A and 7B illustrate how conflicts in selected, claimed, or advertised locally unique N_Port_IDs (LUIDs) are handled during the probing, claiming, and operational states described above with respect to in FIG. 6.

The probing state (step 110) in FIG. 7A corresponds to steps 82 through 90 in FIG. 6. If during the probing state, the VN2VN ENode MAC receives any N_Port_ID Probe Request probing the same tentative locally unique N_Port_ID (step 112), then the VN2VN ENode MAC checks the N_Port_Name carried in a Vx_Port_Identification descriptor of the received N_Port_ID Probe Request. In one embodiment, if the received N_Port_Name (remote P_Name) is greater than the N_Port_Name of its VN2VN_Port (local P_Name) then the VN2VN ENode MAC repeats the process (e.g., selects a new random tentative locally unique N_Port_ID and waits for a random time interval and then transmits N_Port_ID Probe Requests as shown in steps 82-86 of FIG. 6) without replying to the received N_Port_ID Probe Request. If the received N_Port_Name (remote P_Name) is less than the N_Port_Name of its VN2VN_Port (local P_Name) then the ENode retains its selection and replies to the received N_Port_ID Probe Request with an N_Port_ID Probe Reply (step 118).

If while in the probing state, the VN2VN ENode receives a Claim Notification claiming the same locally unique N_Port_ID or a N_Port_ID Beacon where the N_Port_ID field is equal to its VN2VN_Port's N_Port_ID (step 120), the ENode repeats the process (e.g., selects a new random tentative locally unique N_Port_ID and waits for a random time interval and then transmits N_Port_ID Probe Requests as shown in steps 82-86 of FIG. 6). Probe Requests, Claim Notifications, and Beacons received with different locally unique N_Port_IDs are ignored. If no conflicts are received, the process moves on to the claiming state (step 122 of FIG. 7A corresponding to steps 98-101 of FIG. 6).

While in claiming state, if the ENode receives a Probe Request for the same locally unique N_Port_ID (step 124), the ENode sends a Probe Reply (step 126).

If while in claiming state, the ENode receives a N_Port_ID Claim Notification claiming the same locally unique N_Port_ID or a N_Port_ID Beacon where the N_Port_ID field is equal to its VN2VN_Port's N_Port_ID (step 128), there is an N_Port_ID conflict. If the local P_Name is less than the remote P_Name (step 130), the ENode returns to probing state (step 110) and repeats the probing steps (steps 82-90 of FIG. 6), including selecting a new tentative locally unique N_Port_ID (step 82).

If while in claiming state, the ENode receives a Claim Notification with a different locally unique N_Port_ID (step 132), the ENode transmits a Claim Response and adds the notifying VN2VN_Port to its Neighbor Set (step 134). Probe Requests and Beacons on different locally unique N_Port_IDs are ignored. If no conflicts are received, the ENode moves on to operational state (step 136 corresponding to steps 102-106 in FIG. 6).

Reception of a N_Port_ID Beacon from a VN2VN ENode MAC not listed in the VN2VN Neighbor Set is an indication of a network join (steps 138 and 140 in FIG. 7B). The receiving VN2VN ENode MAC transmits a N_Port_ID Claim Notification to All-VN2VN-ENode-MACs (step 142) and collects the N_Port_ID Claim Responses (step 144). N_Port_ID conflicts are not expected in stable network configurations. When joining two previously separated networks there is a chance of conflict, resulting in one or more VN2VN_Ports needing to change their Locally Unique N_Port_IDs. In one embodiment, the one with the greater N_Port_Name maintains its N_Port_ID and the one with the lesser N_Port_Name implicitly logs out from all of the VN2VN_Ports that it is logged into and selects a new locally unique N_Port_ID. As shown in FIG. 7B, if an N_Port_ID conflict is detected upon receiving the N_Port_ID Claim Responses, or Claim Notifications or Beacons are received with the same locally unique N_Port_ID (step 146), the VN2VN ENode MAC resolves the conflict by determining if the local P_Name is less than the remote P_Name (step 148). If the local P_Name is less than the remote P_Name, the ENode relinquishes its N_Port_ID and returns to the probing state (step 110), including selecting a new tentative locally unique N_Port_ID.

The FCoE controller 52 of the VN2VN ENode MAC with the VN2VN_Port 62 with the greater N_Port_Name transmits an N_Port_ID Claim Notification to All-VN2VN-ENode-MACs, to notify all other VN2VN ENode MACs on the network that it has that N_Port_ID, and collects the N_Port_ID Claim Responses (steps 142 and 144). Upon receiving the N_Port_ID Claim Notification, a VN2VN ENode MAC with a VN2VN_Port that had a virtual link with the VN2VN_Port that is changing its N_Port_ID de-instantiates that virtual link.

If while in operational state, a Probe Request with the same locally unique N_Port_ID is received, the ENode transmits a probe reply (steps 150 and 152). If a Claim Notification with a different locally unique N_Port_TD is received (step 154), the ENode transmits a Claim Response and adds the notifying VN2VN_Port to the Neighbor Set (step 156). Probe Requests on different locally unique N_Port_IDs are ignored in operational state.

It is to be understood that the processes illustrated in FIGS. 7A and 7B and described above are only examples and that other methods may be used to resolve conflicts or process claim notifications or beacons for different N_Port_IDs, without departing from the scope of the embodiments. Also, it is to be understood that steps may be added, removed, or reordered without departing from the scope of the embodiments. For example, the probe requests, claim notifications, or beacons may be received simultaneously or in any order during the different states shown in FIGS. 7A and 7B.

The VN2VN ENode MAC preferably maintains a counter of the number of locally unique N_Port_ID conflicts it has experienced while trying to acquire a locally unique N_Port_ID. In one embodiment, if the number of conflicts reach a specified number (e.g., ten) then the VN2VN ENode MAC reports the situation as an indication of potential network failure and limits the rate at which it probes for new locally unique N_Port_IDs to no more than one new N_Port_ID per RATE_LIMIT_INTERVAL (e.g., 10,000 milliseconds). This prevents multicast storms in pathological failure cases, such as a rogue VN2VN ENode MAC that answers all N_Port_ID Probe Requests, causing legitimate VN2VN ENode MACs to go into an infinite loop while attempting to select a usable locally unique N_Port_ID.

Table I below shows an example of FIP operations used by the VN2VN ENodes in the probing, claiming, and operational states, in accordance with one embodiment.

TABLE I

FIP Operation Descriptors

| FIP Operation | Originator | Expected Descriptors and Order |
| --- | --- | --- |
| N_Port_ID Probe Request | VN2VN ENode | 1) MAC address<br>2) Name_Identifier<br>3) Vx_Port Identification |
| N_Port_ID Probe Reply | VN2VN ENode | 1) MAC address<br>2) Name_Identifier<br>3) Vx_Port Identification |
| N_Port_ID Claim Notification | VN2VN ENode | 1) MAC address<br>2) Name_Identifier<br>3) Vx_Port Identification<br>4) FC-4 Attributes<br>5) Max FCoE Size |
| N_Port_ID Claim Response | VN2VN ENode | 1) MAC address<br>2) Name_Identifier<br>3) Vx_Port Identification<br>4) FC-4 Attributes<br>5) Mac FCoE Size |
| N_Port_ID Beacon | VN2VN ENode | 1) MAC address<br>2) Name_Identifier<br>3) Vx_Port Identification |

As shown in Table I, an N_Port_ID Probe Request operation contains a MAC address descriptor, a Name_Identifier descriptor and a Vx_Port Identification descriptor. The MAC address field in the MAC address descriptor is set to the ENode MAC address of the originating VN2VN ENode MAC. The Name_Identifier field in the Name_Identifier descriptor is set to the Node_Name of the originating VN2VN ENode MAC. In the Vx_Port Identification descriptor, the Port_Name field is set to the N_Port_Name of the VN2VN_Port whose tentative locally unique N_Port_ID is being probed, the Address Identifier field is set to the tentative locally unique N_Port_ID, and the MAC address field is set to the tentative VN_Port MAC address (FPMA). The N_Port_ID Probe Request is multicast (addressed to the All-VN2VN-ENode-MACs multicast address).

The N_Port_ID Probe Reply operation contains a MAC address descriptor, a Name_Identifier descriptor and a Vx_Port Identification descriptor. The MAC address field in the MAC address descriptor is set to the ENode MAC address of the originating VN2VN ENode MAC. The Name_Identifier field in the Name_Identifier descriptor is set to the Node_Name of the originating VN2VN ENode MAC. In the Vx_Port Identification descriptor, the Port_Name field is set to the N_Port_Name of the originating VN2VN_Port, the Address Identifier field is set to the locally unique N_Port_ID of the originating VN2VN_Port, and the MAC address field is set to the VN_Port MAC address (FPMA) of the originating VN2VN_Port. The N_Port_ID Probe Reply is unicast and replies to a multicast N_Port_ID Probe Request.

The N_Port_ID Claim Notification operation contains a MAC address descriptor, a Name_Identifier descriptor, a Vx_Port Identification descriptor, an FC-4 Attributes descriptor, and a Max FCoE Size descriptor. The MAC address field in the MAC address descriptor is set to the ENode MAC address of the originating VN2VN ENode MAC. The Name_Identifier field in the Name_Identifier descriptor is set to the Node_Name of the originating VN2VN ENode MAC. In the Vx_Port Identification descriptor, the Port_Name field is set to the N_Port_Name of the originating VN2VN_Port, the Address Identifier field is set to the claimed locally unique N_Port_ID, and the MAC address field is set to the associated VN_Port MAC address (FPMA). The FC-4 Types and FC-4 Features fields of the FC-4 Attributes descriptor are set to the FC-4 Type and Features supported by the originating VN2VN_Port. The Max_FCoE_Size field in the Max FCoE Size descriptor is set to the maximum FCoE PDU size the ENode MAC intends to use for FCoE traffic. The N_Port_ID Claim Notification is multicast (addressed to the All-VN2VN-ENode-MACs multicast address).

The N_Port_ID Claim Response operation contains a MAC address descriptor, a Name_Identifier descriptor, a Vx_Port Identification descriptor, and an FC-4 Attributes descriptor. The MAC address field in the MAC address descriptor is set to the ENode MAC address of the originating VN2VN ENode MAC. The Name_Identifier field in the Name_Identifier descriptor is set to the Node_Name of the originating VN2VN ENode MAC. In the Vx_Port Identification descriptor, the Port_Name field is set to the N_Port_Name of the originating VN2VN_Port, the Address Identifier field is set to the locally unique N_Port_ID of the originating VN2VN_Port, and the MAC address field is set to the VN_Port MAC address (FPMA) of the originating VN2VN_Port. The FC-4 Types and FC-4 Features fields of the FC-4 Attributes descriptor are set to the FC-4 Type and Features supported by the originating VN2VN_Port. The Max_FCoE_Size field in the Max FCoE Size descriptor is set to the maximum FCoE PDU size the ENode MAC intends to use for FCoE traffic. The FTP Pad field is used to extend the FIP PDU to have a length that matches the minimum of the FCoE sizes supported by the two involved VN2VN ENode MACs.

The N_Port_ID Beacon operation contains a MAC address descriptor, a Name_Identifier descriptor and a Vx_Port Identification descriptor. The MAC address field in the MAC address descriptor is set to the ENode MAC address of the originating VN2VN ENode MAC. The Name_Identifier field in the Name_Identifier descriptor is set to the Node_Name of the originating VN2VN ENode MAC. In the Vx_Port Identification descriptor, the Port_Name field is set to the N_Port_Name of the originating VN2VN_Port, the Address Identifier field is set to the locally unique N_Port_ID of the originating VN2VN_Port, and the MAC address field is set to the VN_Port MAC address (FPMA) of the originating VN2VN_Port. The N_Port_ID Beacon is multicast (addressed to the All-VN2VN-ENode-MACs multicast address) and uses the VN_Port MAC address as source address.

In order to deal with local physical layer faults, a VN2VN ENode MAC preferably de-instantiates all of its VN_Ports to VN_Port virtual links upon detecting that its physical layer is no longer operational. In order to deal with non-local faults, the FCoE controller of a VN2VN ENode MAC preferably continuously verifies the state of the VN_Port to VN_Port virtual links by verifying received N_Port_ID Beacons per each VN2VN_Port in the VN2VN login set. For example, N_Port_ID Beacons are expected to be received every ADV_VN_PERIOD. If N_Port_ID Beacons from a VN2VN_Port are not received within 2.5*ADV_VN_PERIOD, the VN_Port to VN_Port virtual link with that remote VN2VN_Port is de-instantiated.

Figure 8:
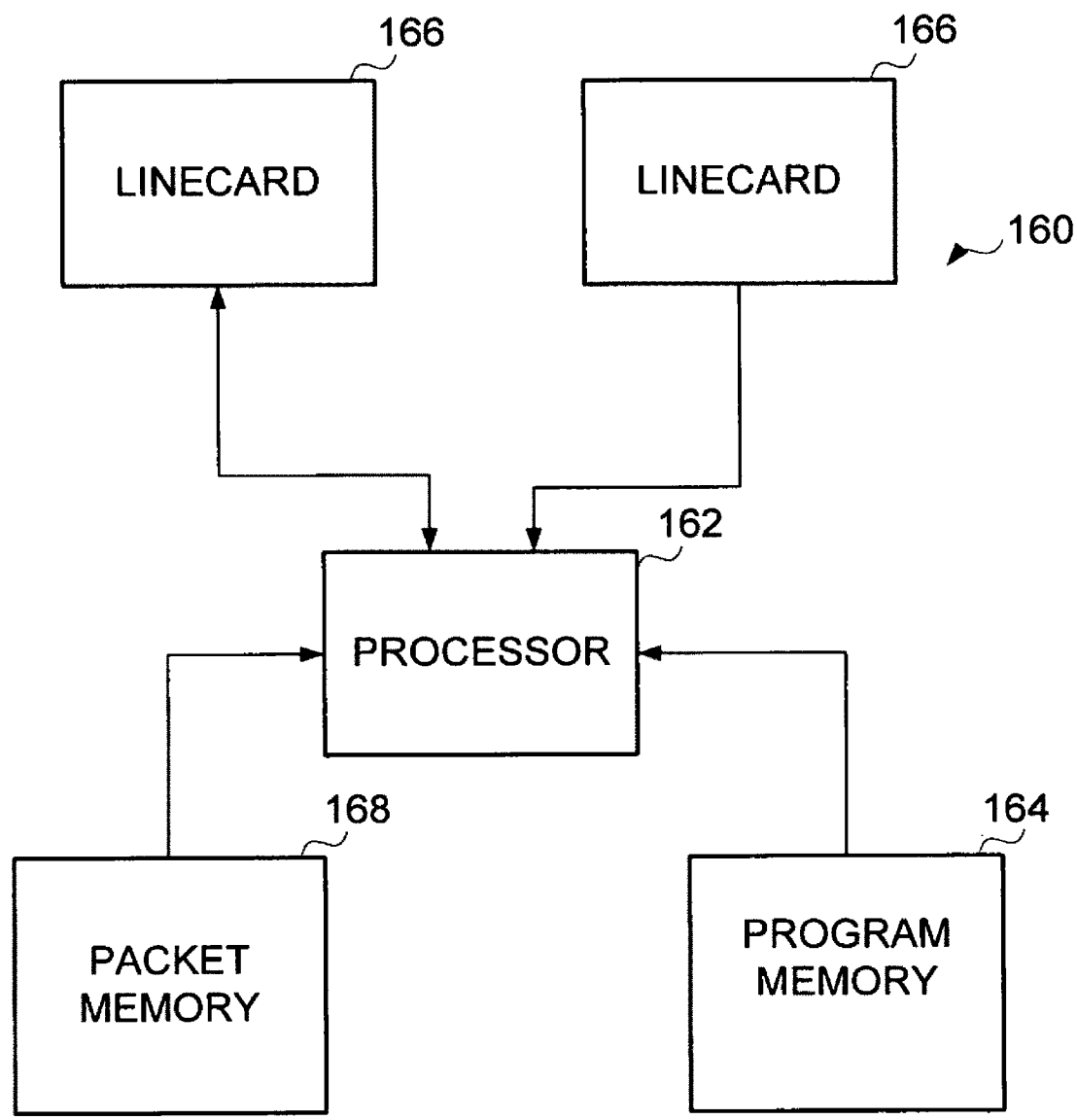
FIG. 8 is a block diagram illustrating an example of a network device useful in implementing embodiments described herein.

FIG. 8 depicts a network device 160 that may be used to implement embodiments described herein. Network device 160 is configured to implement all of the network protocols and extensions thereof described herein. In one embodiment, network device 160 is a programmable machine that may be implemented in hardware, software, or any combination thereof. Logic may be encoded in one or more tangible media for execution by a processor. For example, processor 162 may execute codes stored in a program memory 164. Program memory 164 is one example of a computer-readable medium. Program memory 164 can be a volatile memory. Another form of computer-readable medium storing the same codes is a type of non-volatile storage such as floppy disks, CD-ROMs, DVD-ROMs, hard disks, flash memory, etc.

Network device 160 interfaces with physical media via a plurality of linecards (network interfaces) 166. Linecards 166 may incorporate Ethernet interfaces, DSL interfaces, Gigabit Ethernet interfaces, 10-Gigabit Ethernet interfaces, SONET interfaces, etc. As packets are received, processed, and forwarded by network device 160, they may be stored in a packet memory 168. To implement functionality according to the system, linecards 166 may incorporate processing and memory resources similar to those discussed above in connection with the network device as a whole. It is to be understood that the network device 160 shown in FIG. 8 and described above is only one example and that different configurations of network devices may be used.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
selecting a locally unique node port identifier at a Fibre Channel over Ethernet (FCoE) node in communication with at least one other FCoE node through an Ethernet network;
discovering a virtual node port at said other FCoE node; and
establishing a virtual link between the FCoE nodes for use in local communication over the Ethernet network.

2. The method of claim 1 further comprising configuring the FCoE node to receive frames addressed to a multicast address used by all of the FCoE nodes in communication over the Ethernet network.

3. The method of claim 1 wherein selecting said locally unique node port identifier comprises selecting a tentative locally unique node port identifier and transmitting said tentative locally unique node port identifier to said other FCoE node.

4. The method of claim 3 further comprising transmitting a message claiming said tentative locally unique node port identifier if no replies are received.

5. The method of claim 1 wherein selecting said locally unique node port identifier comprises receiving a message from said other FCoE node, said message indicating a conflict with said locally unique node port identifier, and determining which of the FCoE nodes selects a new locally unique node port identifier.

6. The method of claim 1 further comprising transmitting periodic beacons of said selected locally unique node port identifier.

7. The method of claim 1 wherein selecting said locally unique node port identifier comprises selecting a recorded locally unique node port identifier.

8. The method of claim 1 wherein selecting said locally unique node port identifier comprises generating a pseudo-random number.

9. The method of claim 1 wherein establishing said virtual link comprises performing an FCoE initialization protocol fabric login.

10. The method of claim 1 further comprising determining a Fabric Provided MAC Address (FPMA) based on said locally unique node port identifier.

11. An apparatus comprising:
a processor for selecting a locally unique node port identifier, discovering a virtual node port at a Fibre Channel over Ethernet (FCoE) node when the apparatus is in communication with the FCoE node through an Ethernet network, and establishing a virtual link between the apparatus and the FCoE node for use in local communication over the Ethernet network; and
memory for storing said locally unique node port identifier.

12. The apparatus of claim 11 wherein the apparatus is configured to receive frames addressed to a multicast address used by all of the FCoE nodes in communication over the Ethernet network.

13. The of apparatus of claim 11 wherein selecting said locally unique node port identifier comprises selecting a tentative locally unique node port identifier and transmitting said tentative locally unique node port identifier to said other FCoE node.

14. The apparatus of claim 11 wherein said locally unique node port identifier is different than a node port identifier assigned by a Fibre Channel fabric.

15. The apparatus of claim 11 wherein selecting said locally unique node port identifier comprises receiving a message from said other FCoE node, said message indicating a conflict with said locally unique node port identifier, and determining which of the FCoE nodes selects a new locally unique node port identifier.

16. The apparatus of claim 11 wherein the processor is further configured for transmitting periodic beacons of said selected locally unique node port identifier.

17. The apparatus of claim 11 wherein selecting said locally unique node port identifier comprises selecting a recorded locally unique node port identifier.

18. The apparatus of claim 11 wherein selecting said locally unique node port identifier comprises generating a pseudo-random number.

19. The apparatus of claim 11 wherein the processor is further configured to determine a Fabric Provided MAC Address (FPMA) based on said locally unique node port identifier.

20. Logic encoded in one or more tangible media for execution and when executed operable to:
select a locally unique node port identifier at a Fibre Channel over Ethernet (FCoE) node in communication with at least one other FCoE node through an Ethernet network;
discover a virtual node port at said other FCoE node; and
establish a virtual link between the FCoE nodes for use in local communication over the Ethernet network.

* * * * *